(No Model.)

C. D. RICE.
DEVICE FOR REPAIRING TIRES.

No. 475,344. Patented May 24, 1892.

Witnesses
H. F. Giddings
A. B. Jenkins.

Inventor
Charles D. Rice
by Chas. L. Burdett,
attorney.

UNITED STATES PATENT OFFICE.

CHARLES D. RICE, OF HARTFORD, CONNECTICUT, ASSIGNOR TO THE POPE MANUFACTURING COMPANY, OF BOSTON, MASSACHUSETTS.

DEVICE FOR REPAIRING TIRES.

SPECIFICATION forming part of Letters Patent No. 475,344, dated May 24, 1892.

Application filed February 11, 1892. Serial No. 421,141. (No model.)

*To all whom it may concern:*

Be it known that I, CHARLES DE LOS RICE, of Hartford, in the county of Hartford and State of Connecticut, have invented certain new and useful Improvements in Devices for Repairing Tires, of which the following is a full, clear, and exact description, whereby any one skilled in the art can make and use the same.

My invention relates more particularly to the class of air-inflated tires that are at the present time used on velocipedes and are known by the general name of "pneumatic tires." Such tires are sometimes made of several successive layers of india-rubber and of a textile fabric, the layers being separate from each other, and in other forms the layers are more or less incorporated.

The object of my invention is to provide a means for repairing a punctured tire of the latter class—that is, the devices are more particularly adapted for repairing tires in which the several layers of rubber and textile fabric are closely incorporated; and my invention consists in the details of the several parts making up the repairing means as a whole, and in their combination, as more particularly hereinafter described, and pointed out in the claims.

Figure 1:
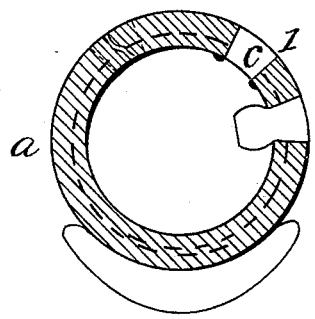
Figure 2:
Figure 3:
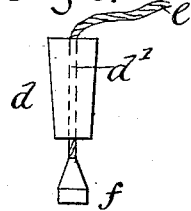
Figure 4:
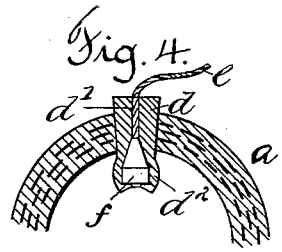

Referring to the drawings, Figure 1 is a view, on an enlarged scale in cross-section, of a pneumatic tire and showing at different points several successive steps in the use of my improved means for repairing a puncture in the tire. Fig. 2 is a detail view, in lengthwise central section, of a tubular cutter. Fig. 3 is a detail side view of a plug and expander. Fig. 4 is a detail view, in central section, of the plug and expander shown in final position in the tire.

In the accompanying drawings, the letter $a$ denotes a tubular tire for a vehicle, made up of an outer layer or tread of india-rubber or like elastic material, an interior layer of textile fabric, such as thin canvas, and an inner layer of india-rubber, the several layers being preferably more or less intimately united to the rubber in making up the tire. When such a tire is expanded, as it must be for use on a wheel, there is a chance for puncture, and in case the wall of the tire is perforated, the air, which is under considerable pressure within the tube, will escape with greater or less rapidity, depending on the size of the hole. In many cases the slightest opening through the wall of the tire is sufficient to allow the air to escape to a degree sufficient to prevent the tire from being filled to a degree of hardness that is required in order to put it in a condition for proper use to obtain to the best degree the advantages that reside in a properly constructed and filled pneumatic tire.

In the practice of my invention a circular piece of the substance of the tire large enough to include the punctured part is cut out, as by means of a tubular cutter $b$ that has a sharp cutting-edge formed on the extreme end of the cutter, the piece being removed by the circular movement of the cutter while it is pressed against the surface of the tire. By this means a tapered hole $c$ is made completely through the wall of the tire, as shown at $l$ in Fig. 1, and by forming the cutting-edge of the cutter slightly tapered from the outside the hole through the wall is made tapering and smaller at the inner edge of the hole than at the outer edge. Having made the hole through the tire, the walls of this opening are smeared with a sufficient quantity of liquid rubber cement or other suitable adhesive material, care being taken to deposit a considerable quantity of the cement about the edge of the hole on the inside of the wall of the tire. A tapered elastic plug $d$, made preferably of india-rubber, is used to fill this hole, and such a plug is inserted, as shown in Fig. 3 of the drawings, the plug being made of proper size to fit snugly into the hole made by a given cutter and to leave the outer end of the plug projecting some distance beyond the surface of the tread of the tire. A hole $d'$ is made lengthwise through the center of the plug $d$, and through this hole a string $e$ extends, an expander $f$ being secured to the inner end of the string. The hole through the plug is made in molding the latter to shape, and such hole is quite small in size. The expander is made preferably of a conical shape, and in any event is tapered or rounded at the upper end and is provided with a somewhat wide body part, the object being to enable the expander to be drawn into the hole in the body of the plug and at the same time be held there by the contraction of the mass of the elastic plug about the lower end of the expander in one form of the device. In using this plug the expander is preferably smeared with the adhesive material and is dropped through the hole in the tire and the plug then inserted in the hole. The expander is then pulled up into the body of the plug by means of the string a sufficient distance to expand the plug until the hole is very snugly filled, leaving the bulge $d^2$ formed by the spreading of the plug by means of the expander preferably within the tire and close to the inside surface. The cement that has been smeared within the hole and on the plug fills the joint at the inner side of the tire about the plug and closes it securely against any leakage of air as soon as the cement is dry, and the plug is also securely cemented to the wall of the hole that is plugged by it. As is shown in the drawings, the expander is held within the plug by the closing in upon it of the elastic material, so that the plug is held in place by this contraction of the hole behind as well as by the cement that glues the string in the hole $d'$. The expander may be provided with expanding-points or made of other shape to anchor it into the walls of the hole $d'$ as an aid for retaining it in place, if desired. After a hole has thus been plugged the outer end of the plug is cut off flush with the surface of the tread, and as soon as the adhesive material used in the repairing has dried (this should be effected within a few hours) the tire may be inflated and used, as the plug will be so securely held in the wall of the tire as to practically form an integral part thereof.

My invention is not limited to the use of an elastic plug of india-rubber, although that material is preferred, nor to the use of any particular form of expander, nor means of introducing it, although the forms and means shown and described are preferred as having worked well in practical tests made of the invention. Nor is it essential to the embodiment of my invention that the opening in the plug should extend completely therethrough, as a good result can be obtained by making an expander-socket within the substance of the plug and forcing the expander in from either end, and I do not limit myself to the particular construction of the expander-socket that is herein illustrated.

I have found by experiment that it is desirable to provide means for locating the expander within the plug at a certain distance, and this is conveniently done by making a knot in the string that shall serve as a gage-knot, the expander being inserted until this knot is flush with the outer end of the plug. The best position for the expander in any given size of plug or for use with any given thickness of tire may be determined by experiment and then such gage-knot may be held at a constant distance for that size and kind of tire.

I claim as my invention—

1. The improved pneumatic-tire-repairing means, consisting of an elastic plug having an expander-socket and an expander adapted to be forced into said socket, all substantially as described.

2. In combination with a tapered elastic plug having an opening therethrough, an expander having a pointed end and widened body part, and a string or like flexible connection extending from the expander through the hole in the plug, all substantially as described.

3. In combination with a pneumatic tire having a plug-socket through the wall thereof, an expansible elastic plug fitted into the socket and held therein in part by means of an expander held within the body of the plug, all substantially as described.

4. In combination with a pneumatic tire, a repairing means comprising a tapered elastic plug having an opening therethrough located in an opening cut through the wall of the tire, an expander held within the body of the plug, and adhesive material, as cement, whereby the leaking of air through the plug-socket is prevented, all substantially as described.

CHARLES D. RICE.

Witnesses:
CHAS. L. BURDETT,
GEO. H. DAY.